(12) United States Patent
Srivastava et al.

(10) Patent No.: US 6,609,248 B1
(45) Date of Patent: Aug. 19, 2003

(54) CROSS MODULE REPRESENTATION OF HETEROGENEOUS PROGRAMS

(75) Inventors: Amitabh Srivastava, Woodinville, WA (US); Hoi H. Vo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/343,287

(22) Filed: Jun. 30, 1999

(51) Int. Cl.$^7$ ............................................... G06F 9/45
(52) U.S. Cl. .................... 717/147; 717/141; 717/146; 717/148; 717/149; 717/152; 717/153; 717/154; 717/159; 717/161
(58) Field of Search .................. 717/147, 141–146, 717/153–158, 148, 149, 152–154, 159, 161

(56) References Cited

U.S. PATENT DOCUMENTS

| | | | | |
|---|---|---|---|---|
| 5,280,613 A | * | 1/1994 | Chan et al. ................. | 717/141 |
| 5,559,884 A | | 9/1996 | Davidson et al. ............ | 380/4 |
| 5,664,191 A | | 9/1997 | Davidson et al. ........... | 395/670 |
| 5,790,858 A | | 8/1998 | Vogel ........................ | 395/704 |
| 6,253,252 B1 | * | 6/2001 | Schofield ..................... | 709/315 |
| 6,253,369 B1 | * | 6/2001 | Cloud et al. ................... | 171/5 |

OTHER PUBLICATIONS

Aho et al., "Compilers, Principles, Techniques, and Tools", Addison–Wesley Publishing, Chapter 9, pp.: 513–519, 1988.*
Huang et al., "Communicating Abstract Data Type Values in Heterogeneous Distributed Programs", IEEE, pp.: 458–465, Oct. 1994.*
Goto et al., " Optimized Code Generation for Heterogeneous Computing Environment Using Parallelizing Compiler TIN-PAR", IEEE, pp.: 1–8, Oct. 1998.*
De Bosschere, K., et al., "Alto: A Link–Time Optimizer for the DEC Alpha.", *Technical Report TR–96–16*, (1996).
Goodwin, D.W., "Interprocedural Dataflow Analysis in an Executable Optimizer", *Proceedings on SIGPLAN'97 Conference on Programming Language Design and Implementation*, (1997).
Hastings, R., et al., "Purify: Fast Detection of Memory Leaks and Access Errors", *Proceedings of Winter Usenix Conference,*, (Jan. 1992).
Larus, J., et al., "Rewriting Executable Files to Measure Profeam Behavior", *Software Practice and Experience*, 24(2), 197–218, (1994).
Larus, J.R., "EEL: Machine–Independent Executable Editing", *ACM SIGPLAN Notices*, 30(6), pp. 291–300, (Jun. 1995).
Lee, H., et al., "A Tool for Instrumenting Java Bytecodes", *Proceedings of the 1997 USENIX Symposium pn Internet Technologies and Systems*, (1997).
Romer, T., et al., "Instrumentation and Optimization of Win32/Intel Executables Using Etch", *Proceedings of the USENIX Windows NT Workshop*, (1997).

(List continued on next page.)

Primary Examiner—Gregory Morse
Assistant Examiner—Ted T. Vo
(74) Attorney, Agent, or Firm—Merchant & Gould P.C.

(57) ABSTRACT

An output translator provides for cross module representations of components within a heterogeneous program by translating modifying a platform-neutral intermediate representation (IR) of the program into platform-specific instructions for different architectures. The intermediate representation is hierarchy of base elements that correspond to instructions, code blocks, procedures and components within the program. Blocks of instructions that were originally written for one architecture can be translated from the intermediate representation into platform-specific instructions for a different architecture. The output translator provides any necessary code to interface contiguous code blocks that are emitted in different instruction sets.

24 Claims, 11 Drawing Sheets

OTHER PUBLICATIONS

Srivastava, A., et al., "A Practical System for Intermodule Code Optimization at Link Time", *Journal of Programming Language*, 1(*1*), 1–18, (1993).

Srivastava, A., et al., "ATOM, A System for Buidling Customized Program Analysis Tools", *ACM SIGPLAN Notices*, 29(*6*), pp. 196–205, (Jun. 1994).

Wall, D.W., "Systems of Late Code Modification, in Code Genetatio–Concepts, Tools Technique", *Robert Giegrich and Susan L. Graham, eds*, 275–293, (1992).

* cited by examiner

CROSS MODULE REPRESENTATION OF HETEROGENEOUS PROGRAMS

RELATED APPLICATIONS

The present application is related to U.S. Patent applications entitled "Translation And Transformation of Heterogeneous Programs" (U.S. patent application Ser. No. 09/343,805), "Instrumentation and Optimization Tools for Heterogeneous Programs" (U.S. patent application Ser. No. 09/343,298), "Application Program Interface for Transforming Heterogeneous Programs" (U.S. patent application Ser. No. 09/343,276), and "Shared Library Optimization for Heterogeneous Programs" (U.S. patent application Ser. No. 09/343,279), filed on the same day as the present application and assigned to the same assignee.

FIELD OF THE INVENTION

This invention relates generally to programming tools, and more particularly to translating code between computer architectures.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1998, Microsoft Corporation, All Rights Reserved.

BACKGROUND OF THE INVENTION

In a new programming paradigm, a program is now a collection of components. Each component publishes an interface without exposing its inner details. Thus, a component can internally exist in any form: Intel x86 binary, Intel IA-64 binary, Visual Basic (VB) byte codes, Java class files, or any Virtual Machine (VM) binary. A heterogeneous program consists of components in different forms. Heterogeneous programs already exist in some environments: in the Microsoft Windows 32-bit environment, a Visual Basic program is compiled into VB byte codes that can call native-compiled functions in a separate dynamic linked library. Similarly Java class files can call native functions. Intel's IA-64 architecture allows IA-64 code to co-exist with x86 code.

To understand the behavior of a heterogeneous program, all its components, regardless of their form, have to be instrumented and analyzed in the same framework, otherwise, only partial information will be collected. It is important to note that systems that have been ported to several architectures are not sufficient to handle heterogeneous programs. For example, a system for VB byte codes that has been ported to x86, cannot provide a complete execution time analysis of a heterogeneous program consisting of VB byte codes and native x86 because each system operates in isolation on its own input.

Further, a heterogeneous program may consist of heterogeneous components. A heterogeneous component is a single component consisting of routines in different instruction sets. As the interface is well defined, components internally can use any instruction set. Each instruction set has its own advantages such as execution time, portability, and size.

All previous systems have been designed for homogeneous programs: conventional programs consisting of components in the same form. Some systems have been targeted to different architectures, but cannot work with heterogeneous programs. None of these systems can generate a heterogeneous component.

A large number of systems have been developed to help analyze and optimize homogeneous programs. The creation of "Pixie" by MIPS Computers Systems, Inc. in 1986 started a class of basic block counting tools by inserting predetermined sequence of instructions to record execution frequencies of basic blocks. "Epoxie" extended the technique by using relocations to eliminate dynamic translation overheads. David W. Wall. Systems for late code modification, in Code Generation—Concept, Tools Techniques, pp. 275–293, (Robert Giegrich and Susan L. Graham, eds, 1992). "QPT" further extended the technique by constructing spanning trees to reduce the number of basic blocks that are instrumented. James Larus and Thomas Ball, Rewriting executable files to measure program behavior, Software, Practice and Experience, vol. 24, no. 2, pp 197–218 (1994). "Purify" instruments memory references to detect out-of-bounds memory accesses and memory leaks. Reed Hastings and Bob Joyce, Purify: Fast Detection of Memory Leaks and Access Errors, Proceedings of Winter Usenix Conference, January 1992.

"OM" allowed general transformations to be applied to a binary by converting the binary to an intermediate representation that can be easily manipulated. Amitabh Srivastava and David Wall, A Practical System for Intermodule Code Optimization at Link Time, Journal of Programming Language, 1(1):1–18 (1993). OM has been implemented on MIPS, DEC Alpha and Intel x86 architectures. "EEL" uses a similar technique and provides an editing library for Sun SPARC architectures. James R. Larus and Eric Schnarr, EEL: Machine-Independent Executable Editing, Proceedings of SIGPLAN' 95 Conference on Programming Language Design and Implementation (1995). "Alto" and "Spike" are optimizers for the DEC Alpha architectures. K. De Bosschere and S. Debray, Alto: a Link-Time Optimizer for the DEC Alpha. Technical Report TR-96-16, Computer Science Department, University of Arizona (1996). David W. Goodwin, Interprocedural Dataflow Analysis in an Executable Optimizer, Proceedings of SIGPLAN' 97 Conference on Programming Language Design and Implementation (1997).

"ATOM" extended OM by providing a flexible instrumentation interface for the DEC Alpha and Intel x86 systems. Amitabh Srivastava and Alan Eustace, ATOM: A System for Building Customized Program Analysis Tools, Proceedings of SIGPLAN' 94 Conference on Programming Language Design and Implementation (1994). However, ATOM does not allow modifications to a binary. "Etch" provided a similar system for x86 and "BIT" for Java byte codes. T. Romer, G. Voelker, D. Lee, A. Wolman, W. Wong, H. Levy, B. Chen, and B. Bershad, Instrumentation and Optimization of Win32/Intel Executables Using Etch, Proceedings of the USENIX Windows NT Workshop (1997). Han Lee and Benjamin Zorn, BIT: A Tool for instrumenting Java bytecodes. Proceedings of the 1997 USENIX Symposium on Internet Technologies and Systems (1997).

None of these systems work on heterogeneous programs. Some of them have been ported to multiple architecture but they provide only a partial view when applied to heterogeneous programs as each implementation operates on its input in isolation. Although OM builds a symbolic representation, the representation was primarily designed for applying arbitrary transformations and is not sufficient to handle heterogeneous programs. None of these systems can generate heterogeneous components. ATOM provides a flexible interface for instrumentation only.

Because a heterogeneous program provides efficiencies that cannot be achieved by a homogeneous program, a mechanism is needed that can convert portions of a homogeneous program into a different instruction set to optimize the execution of the program or produce more compact code. Furthermore, the ability to apply the same mechanism to an existing heterogeneous program to produce further optimization is also desirable.

SUMMARY OF THE INVENTION

The above-mentioned shortcomings, disadvantages and problems are addressed by the present invention, which will be understood by reading and studying the following specification.

An output translator provides for cross module representations of components within a heterogeneous program by enabling a code block in a component to be translated from an platform-neutral intermediate representation of the program into a set of platform-specific instructions that are directed to a different architecture than that for which the code block was originally written. The output translator provides any necessary prologue and/or epilogue code to interface contiguous code blocks that are emitted in different instruction sets. For an architecture that has both short and long forms for instructions, one aspect of the output translator initially assumes the emitted instruction will be in its short form and only substitutes the long form when required. The output translator also enables the substitution of one code block for another, automatically adjusting entry points as required. Changes in the order of code blocks within the component are accommodated while preserving, and optimally optimizing, the original control flow.

Because the architecture of a code block can be changed when it is translated from the intermediate representation, a user can create a more efficient heterogeneous program from a homogeneous program or can optimize an existing heterogeneous program by specifying an architecture that supplies a desired characteristic, such as speed or compactness of code. Even without changing platform, the output translator can produce more compact code than originally generated by a compiler because the output translator uses short forms for instructions as a default size where the majority of compilers default to long forms. Additionally, the output translator can emit instructions for a new platform for which a compiler is not yet been written, allowing early testing and evaluation of the architecture.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, methods and data structures for an exemplary embodiment of the invention are provided. Finally, in the fourth section, a conclusion of the detailed description is provided.

Hardware and Operating Environment

Figure 1:
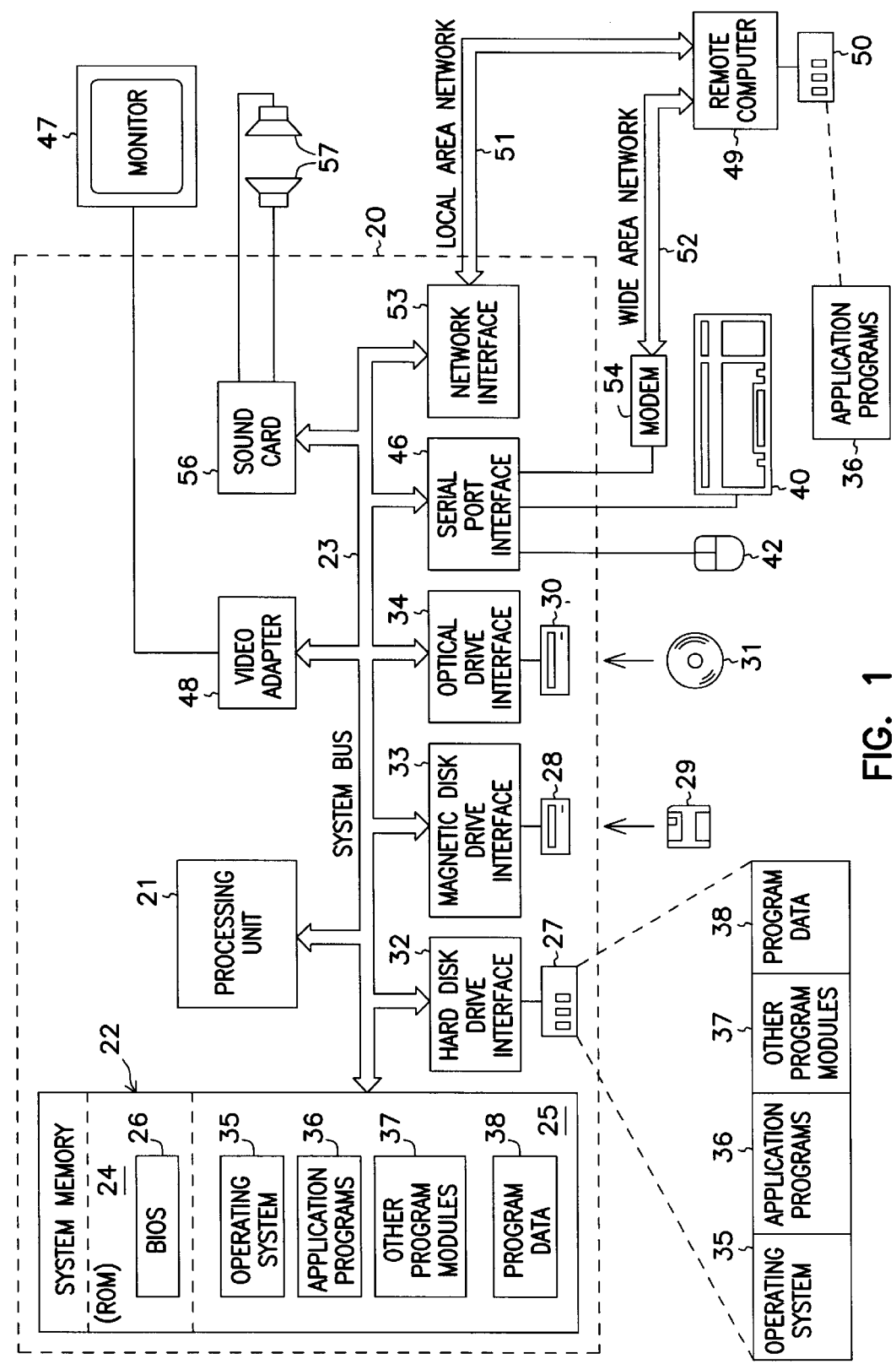
FIG. 1 is a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

Figure 2A:
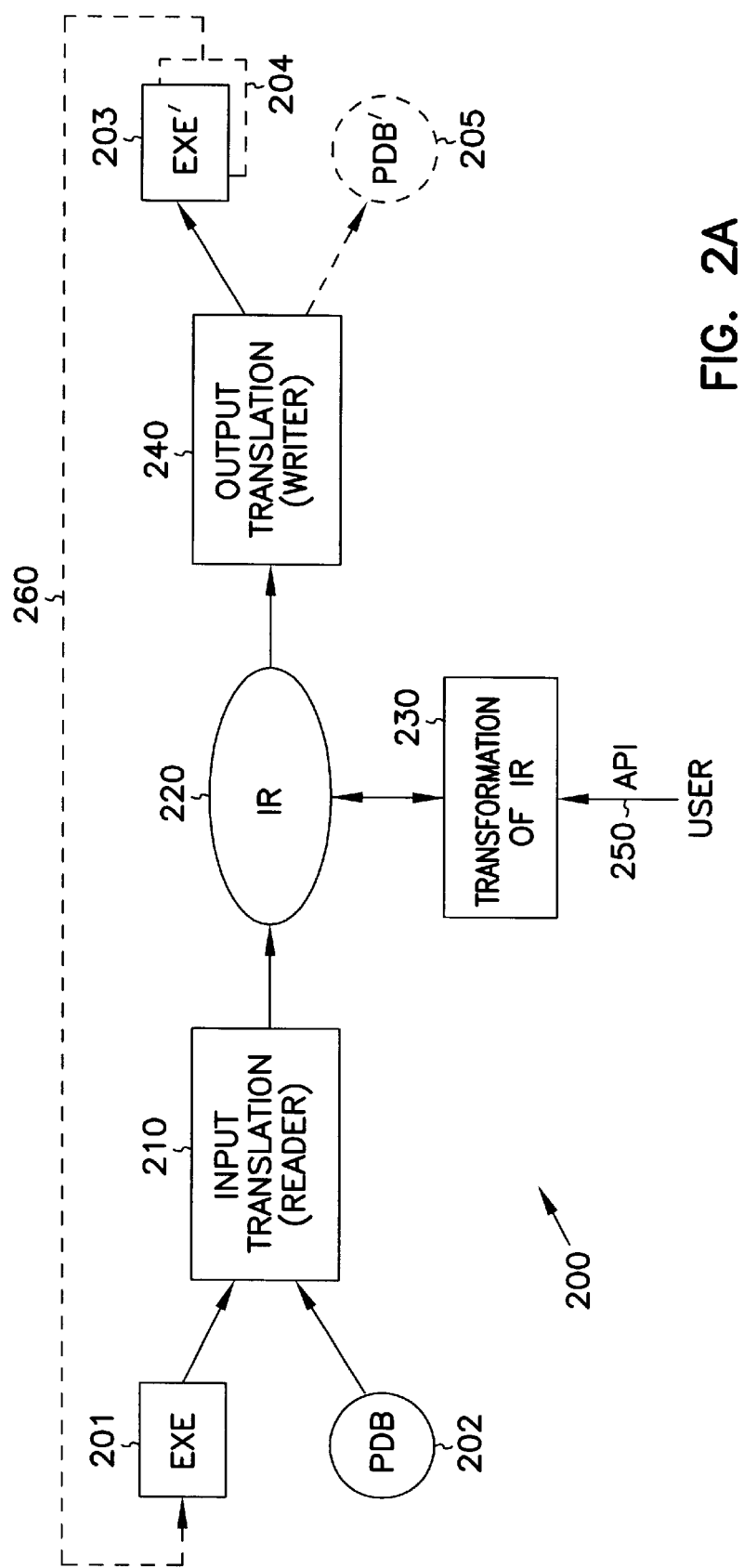
FIG. 2A is a diagram illustrating a system-level overview of an exemplary embodiment of the invention.

A system level overview of the operation of an exemplary embodiment of the invention is described by reference to FIGS. 2A–D. A heterogeneous program contains multiple executable components, such as main program code and shared libraries, written for different computer architectures (platforms) or programming languages. FIG. 2A shows a system 200 that translates and transforms components in a heterogeneous program. The system 200 comprises an input translator (reader) 210, a transformation module 230, and an output translator (writer) 240. All three modules work with a high-level abstraction of a heterogeneous program, referred to as an "intermediate representation" (IR) 220. The IR is a set of pseudo-instructions for a stack-based logical machine with an unlimited number of registers that represent the functionality of the heterogeneous program.

Figure 2B:
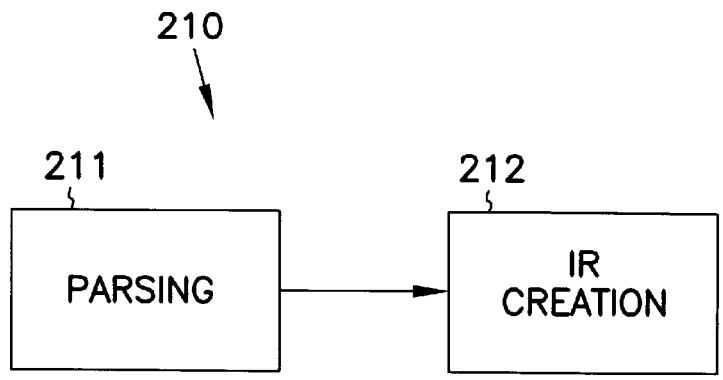
FIGS. 2B, 2C and 2D are diagrams illustrating additional details of the processes shown in FIG. 2A.
Figure 2C:
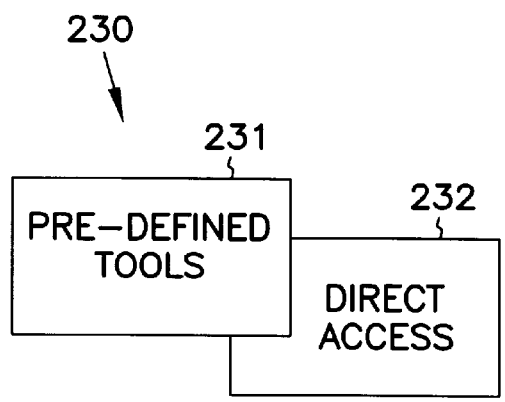

The reader 210 creates an IR 220 from an executable component (EXE) 201. The reader 210 is a two-stage process as shown in FIG. 2B. First, the executable 201 is parsed 211 into its basic blocks of code and data using information provided in a program database file (PDB) 202. As well-known in the art, a basic code block is defined as a code block having a single entry point and a single exit point. In an alternate embodiment, all the work performed by the parser 211 is input directly into the second stage of the reader 210, thus skipping the parsing process.

Once the code and data blocks are identified, an IR creation process 212 evaluates each platform-dependent instruction on a block-by-block basis. There are very large set of common instructions regardless of architecture, i.e., move, store, add, etc., that can be represented by a single platform-neutral IR instruction. For RISC (reduced instruction set computer) architectures, most, if not all, instructions can be easily translated into a single platform-neutral IR instruction. On the other hand, CISC (complex instruction set computer) architectures, such as the Intel x86 family, contain complex instructions that provide the function of multiple instructions. In one exemplary embodiment, the platform-dependent instructions that have a single platform-neutral IR instruction counterpart are translated into that platform-neutral instruction, while complex instructions are replicated as-is within the IR through an extended version of the basic IR instruction. A replicated complex instruction is marked with a signature that denotes its architecture. The output translator 240 recognizes a signed complex instruction and processes it as described further below. In an alternate embodiment, a complex instruction is represented by a set of platform-neutral IR instructions that perform the equivalent function.

Figure 3:
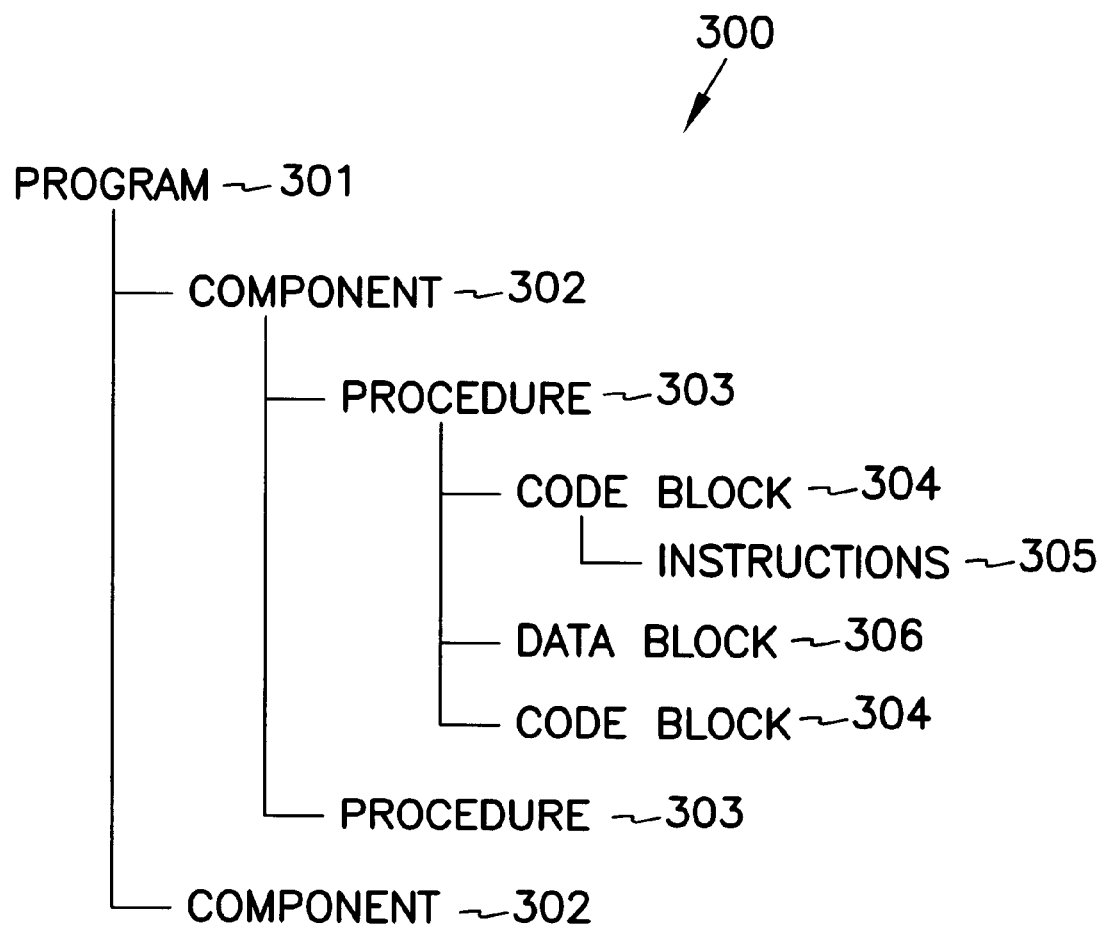
FIG. 3 is a diagram of an intermediate representation hierarchy used by the exemplary embodiment of FIG. 2A.

After the instructions in the code blocks have been translated, the IR creation process 212 creates a logical hierarchical view of the executable 201 as illustrated in FIG. 3. All architectures share the basic concepts of instructions 305, code blocks 304, data blocks 306, components 302, and procedures 303, so the IR hierarchy 300 enables the user to understand the structure of the intermediate representation of a heterogeneous program 301. The code blocks are logically connected as specified in the EXE file 201 so that the blocks can be more easily manipulated during the transformation process 230. Procedures are determined by following the logical connections using information provided in the PDB file 202. Procedures are collected together to create the program components. Little or no optimization of the program is performed by the creation process 212 since it is desirable that the intermediate representation be as close to what the programmer originally wrote as possible.

However, tracing the logical connections to determine the procedures can result in more procedures being created than originally coded by the programmer as described in the related "Translation and Transformation" patent application. Therefore, the creation process 212 annotates, or "decorates," the hierarchy 300 with the user names supplied in the symbol table for the EXE 201. The annotations enable the user to understand how the IR control flows and how the elements of the IR hierarchy correspond to the procedures and the components in the original code so the appropriate transformations can be applied to the IR. The annotations are maintained in data structures for the procedures during the transformation process and output by the output translator 240.

At the end of the creation of the IR hierarchy, all instructions are represented in the hierarchy as IR instructions within code blocks so that there is no differentiation between code written for one platform and code written for a second platform. The creation of the IR and an exemplary embodiment of the IR hierarchy are described in detail in the related "Translation and Transformation" patent application.

Once the intermediate representation is complete, the user is allowed to manipulate the code and data (illustrated by the IR transformation module 230) through an application program interface (API) 250. The exemplary embodiment of the system 200 provides some pre-defined tools 231 (FIG. 2C) used to instrument and optimize the IR that are guaranteed to be safe in that the tools will evaluate a change requested by the user and only manipulate the code in an appropriate manner. The API 250 also permits the user direct access 232 to the IR to navigate through the IR and to make changes, such as moving blocks between procedures, modifying blocks, rearranging the logical connections between blocks, and changing the platform-specific instruction set for a code block. The tools 231 are described in detail in the related "Instrumentation and Optimization Tool" patent application. The API 250 is described in detail in the related "Application Program Interface" patent application.

By instrumenting the IR using the tools 231, the user can now watch the interrelationship between the various components of a heterogeneous program and determine if a block of code contained in one component is heavily used by another component, and therefore that block of code should be moved out of the first component and placed into the second component to speed up execution. This process is described in detail in the related "Shared Library Optimization" patent application. Alternately, the user may decide to copy, instead of move, the code into the second component, a process referred to in the art as "code replication." A common optimization technique called "inlining" utilizes code replication.

Figure 2D:
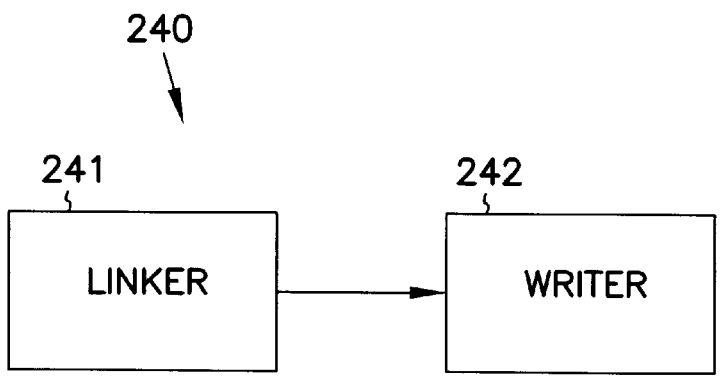

The transformed IR is now input into the output translator 240. The output translator 240 operates on the IR in two phases as shown in FIG. 2D: a linker phase 241 that resolves the logical connections into absolute addresses in an address space for a modified version of the executable, and a writer phase 242 that assembles the IR into the modified version of the executable (EXE') 203. The blocks in the executable 203 can be emitted by the writer 242 for their original platform, or can be emitted for a different platform.

The linker 241 must maintain the semantics of the code of the hierarchy when resolving the addresses, i.e., preserve the logical connections between blocks and the location of referenced data. The linker 241 determines the size of each code block based on the length of each instruction in the block. The linker 241 is also responsible for adding whenever prologue and epilogue code necessary to "glue" together contiguous blocks that will be assembled into different platform-dependent instructions. As part of the address resolution, the linker 241 also can perform limited code modification or optimization. For example, assume that prior to the transformation process 230, there was a jump between two code blocks, but those blocks are now contiguous. In this case, the linker 241 removes the now-unnecessary jump and lets the logic flow fall through to the second block. Because the hierarchy extends down to the instruction level and is consistent regardless of the manipulation performed by the user, the linker 241 has more knowledge of the placement of instructions than did the programmer. Thus, in architectures in which instructions have both a long and short form depending on the location they are addressing, the linker 241 chooses the appropriate instruction size, which can be a better choice than that originally made by the programmer.

The writer 242 assembles each IR instruction into its platform-dependent counterpart based on the architecture specified in the code block. In an exemplary embodiment in which complex instructions are replaced in the IR, if the complex instruction is being written to the same platform, the writer 242 merely emits the instruction. If the complex instruction is designated to be translated into a different architecture, the writer 242 creates the appropriate set of platform-specific instructions to perform the same function as the original, complex instruction.

As part of the EXE' 203, the writer 242 creates an emitted block information data structure containing the annotations created by the reader process 210 for each block in the executable. This allows the EXE' 203 to be iterated through the entire process 200 as many times as desired (represented by phantom arrow 260 and described in the related "Translation and Transformation" patent application), while enabling the user to distinguish the original procedures from those added in a previous iteration. In an alternate embodiment, the emitted block information is combined with the PDB file 202 to create a new version of the program database file (PDB') 205 (shown in phantom). The output translation process 240 is described in detail in the related "Cross Module Representation" patent application.

In an alternate exemplary embodiment of the translation and transformation system 200 not illustrated, the IR containing the absolute addresses assigned by the linker 241 is used as input into the IR creation process 212 for further iteration through the system 200. One of skill in the art will immediately appreciate that much of the work performed by the creation process 212 as described above can be skipped when iterating the modified IR through the system 200. This embodiment allows the user to transform a heterogeneous program in stages rather than having to make all the changes in a single pass through the system 200. The system level overview of the operation of an exemplary embodiment of the invention has been described in this section of the detailed description. A translation and transformation system translates a binary component into an intermediate representation, provides an application program interface through which a user can transform the intermediate representation, and translates the intermediate representation as transformed by the user into a modified version of the binary. While the invention is not limited to any particular arrangement of modules, for sake of clarity exemplary set of modules has been described. One of skill in the art will readily recognize that the functions attributed to the modules described in this section can be assigned to different modules without exceeding the scope of the invention. Furthermore, although the translation and transformation of only one input component (EXE 201) has been illustrated and described above, the system can take multiple components, and accompanying PDB files, as input.

Methods of Exemplary Embodiments of the Invention

Figure 4A:
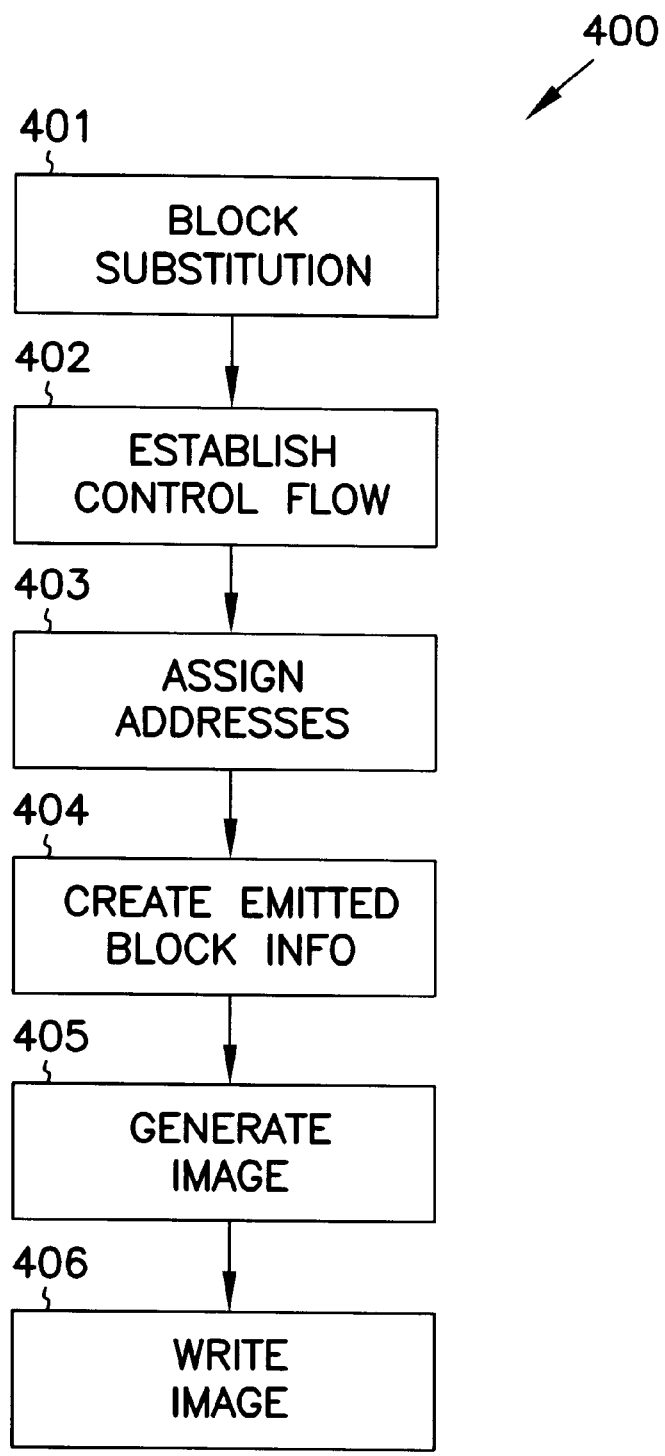
FIG. 4A is a flowchart of an output translator method to be performed by a computer according to an exemplary embodiment of the invention.
Figure 4B:
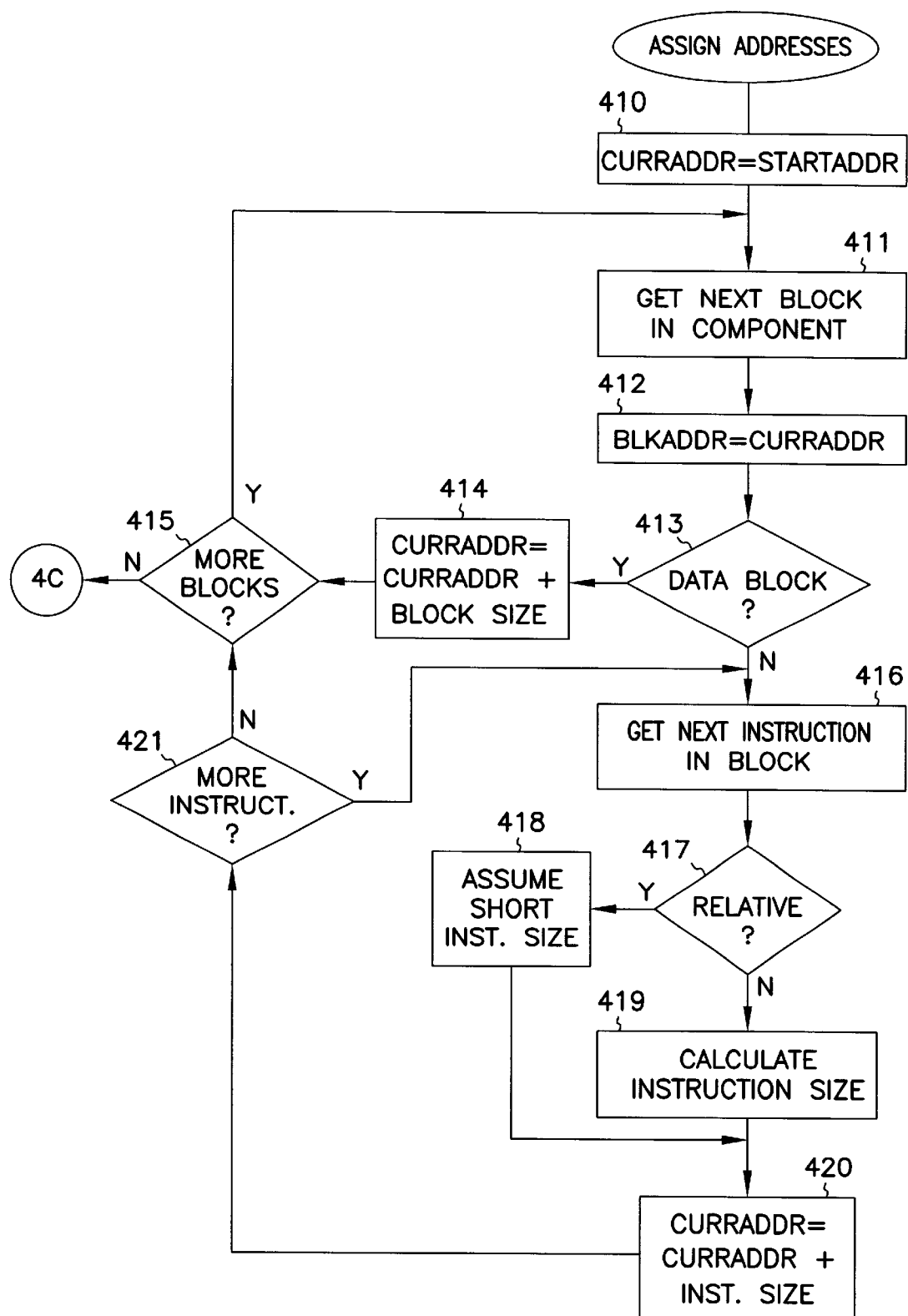
FIGS. 4B and 4C are flowcharts of details of the exemplary embodiment of the output translator method of FIG. 4A.
Figure 4C:
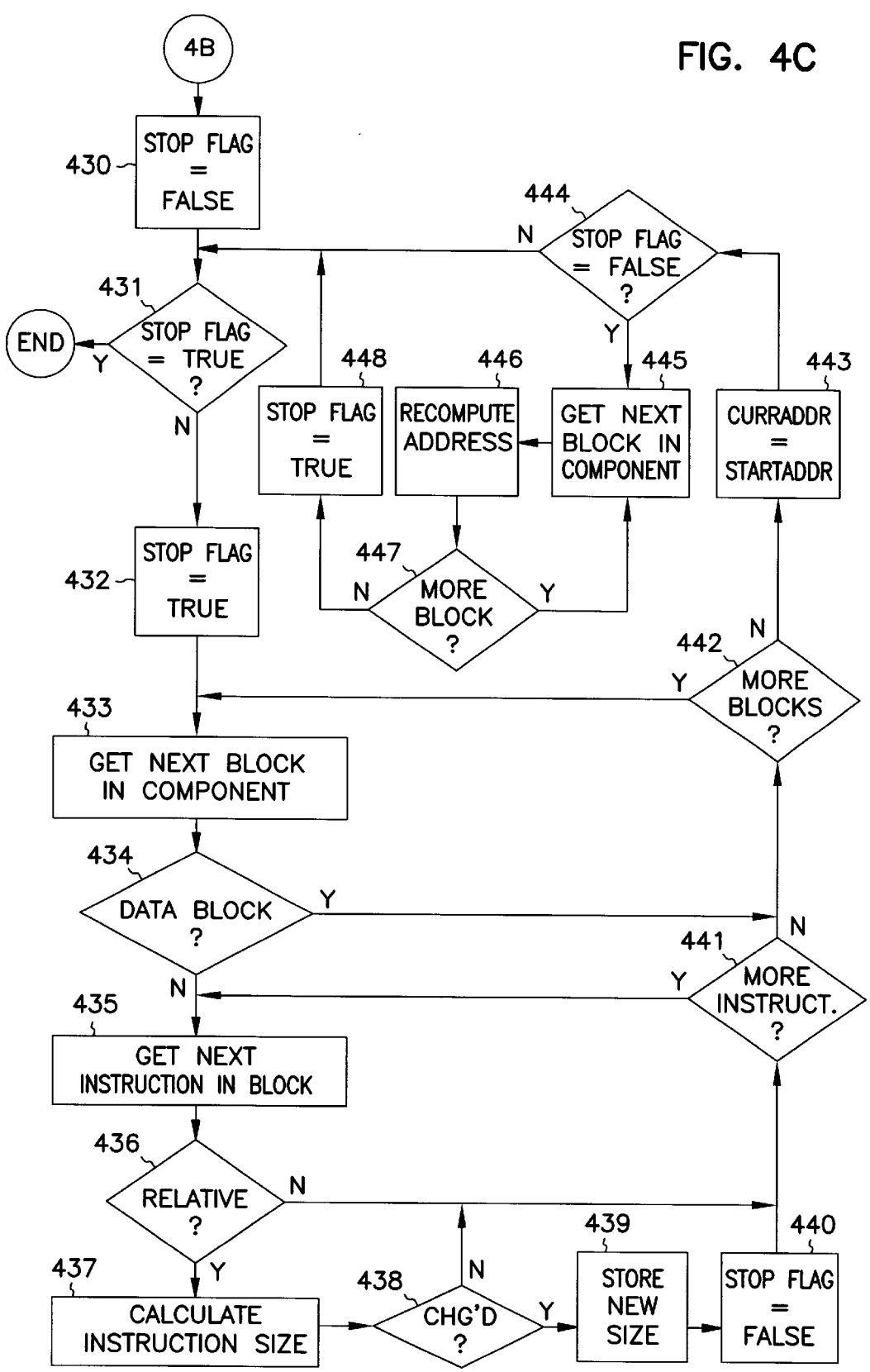

In the previous section, a system level overview of the operations of exemplary embodiments of the invention was described. In this section, the particular methods performed by a computer executing such exemplary embodiments are described by reference to a series of flowcharts. The methods to be performed constitute computer programs made up of computer-executable instructions. Describing the methods by reference to a flowchart enables one skilled in the art to develop such programs including such instructions to carry out the methods on a suitable computer (the processor of the computer executing the instructions from computer-readable media). FIGS. 4A–C illustrate the acts to be performed by a computer executing an exemplary embodiment of a linker/writer method that performs the output translator process 240 shown in FIGS. 2A and 2D. A heterogeneous program contains at least one component, shown in FIG. 2A as EXE 201, that is translated into an IR hierarchy 220. After any desired transformations 230 are performed on the IR hierarchy 220 by a user, the exemplary embodiment of the linker/writer method 400 takes each component at a time and translates the IR instructions in the component into platform-specific instructions as shown in FIG. 4A. The linker/writer method 440 relies on the information contained within the IR hierarchical elements that represent instructions, blocks, procedures and components (as described in the related "Translation And Transformation" patent application) to determine what processing is required. In the exemplary embodiment, the acts represented by blocks 401–404 are performed by the linker module 241 shown in FIG. 2D, while the acts represented by blocks 405–406 are performed by the writer module 242. The acts represented by block 403 are described in detail with reference to FIGS. 4B and 4C.

Figure 5:
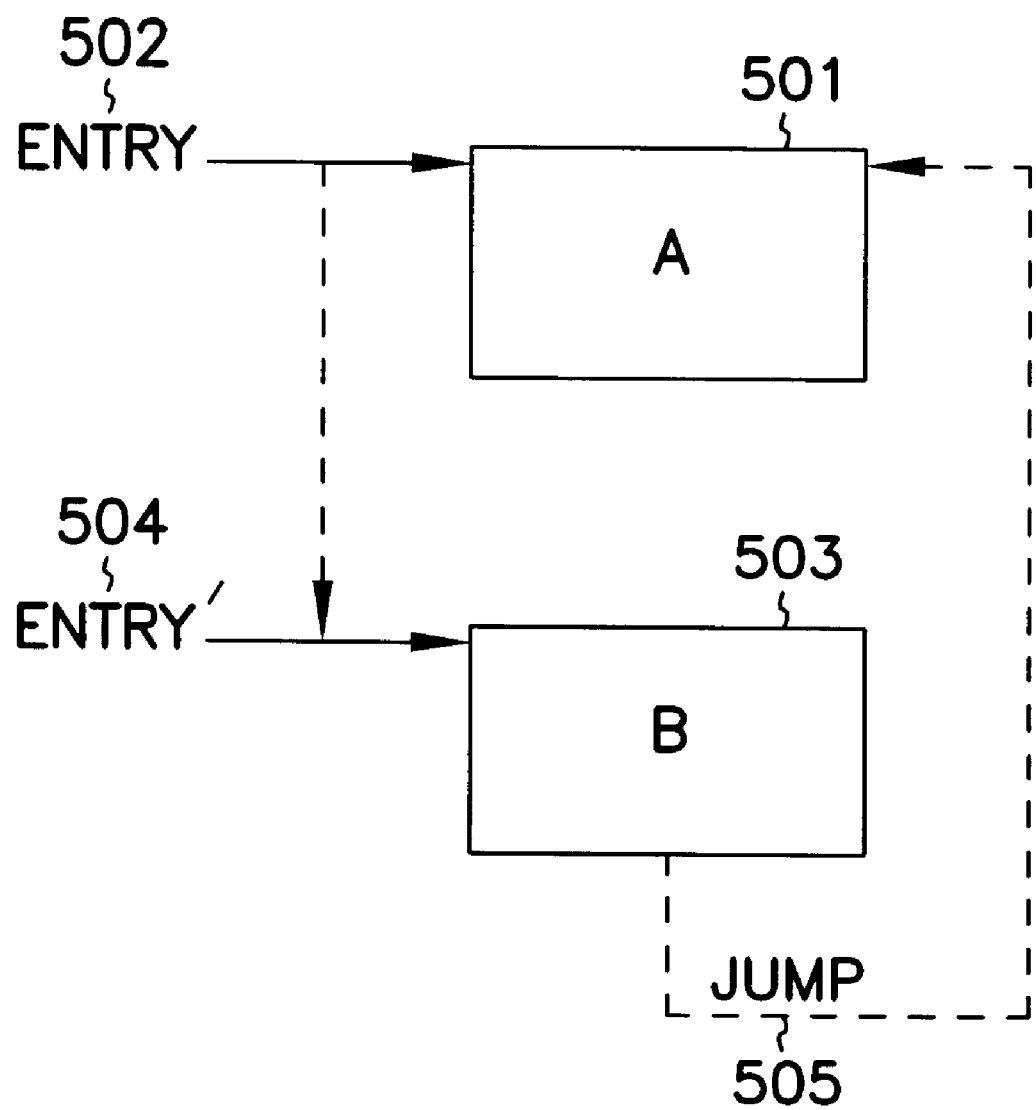
FIG. 5 is a diagram of a redirected block created by the output translator method of FIG. 4A.

The linker/writer method 400 begins by determining if the user has substituted any new code blocks for original code blocks in the component (block 401) during the transformation process 230 (FIG. 2A) as illustrated in FIG. 5. In such a situation, the transformation process 230 leaves code block A 501 in the IR for the component as a placeholder. In one embodiment, the linker/writer method 400 walks through the IR, finding each entry point reference 502 to block A 501 and replacing the entry point reference 502 with the entry point reference 504 to block B 503. In an alternate embodiment also shown in FIG. 5 in which block A is supplemented but not wholly replaced in the transformation process, a call to block A 501 is redirected to block B 503. Block B 503 performs its functions, concluding with a jump 505 back to block A 501 so the contents of block A 501 can be executed. In both these embodiments, block A 501 remains in the IR. In yet another alternate embodiment, the linker/writer method replaces code block A 501 with code block B 503, making block A a "phantom" block.

Also at block 401, the linker/writer method automatically rebuilds the necessary data structures that are specific to the binary output file format. For example, regarding Win32 PE (Portable Executable) images, the imports, exports, and thread local storage (TLS) sections are rebuilt using the information stored in the IR hierarchy data structures.

Figure 6A:
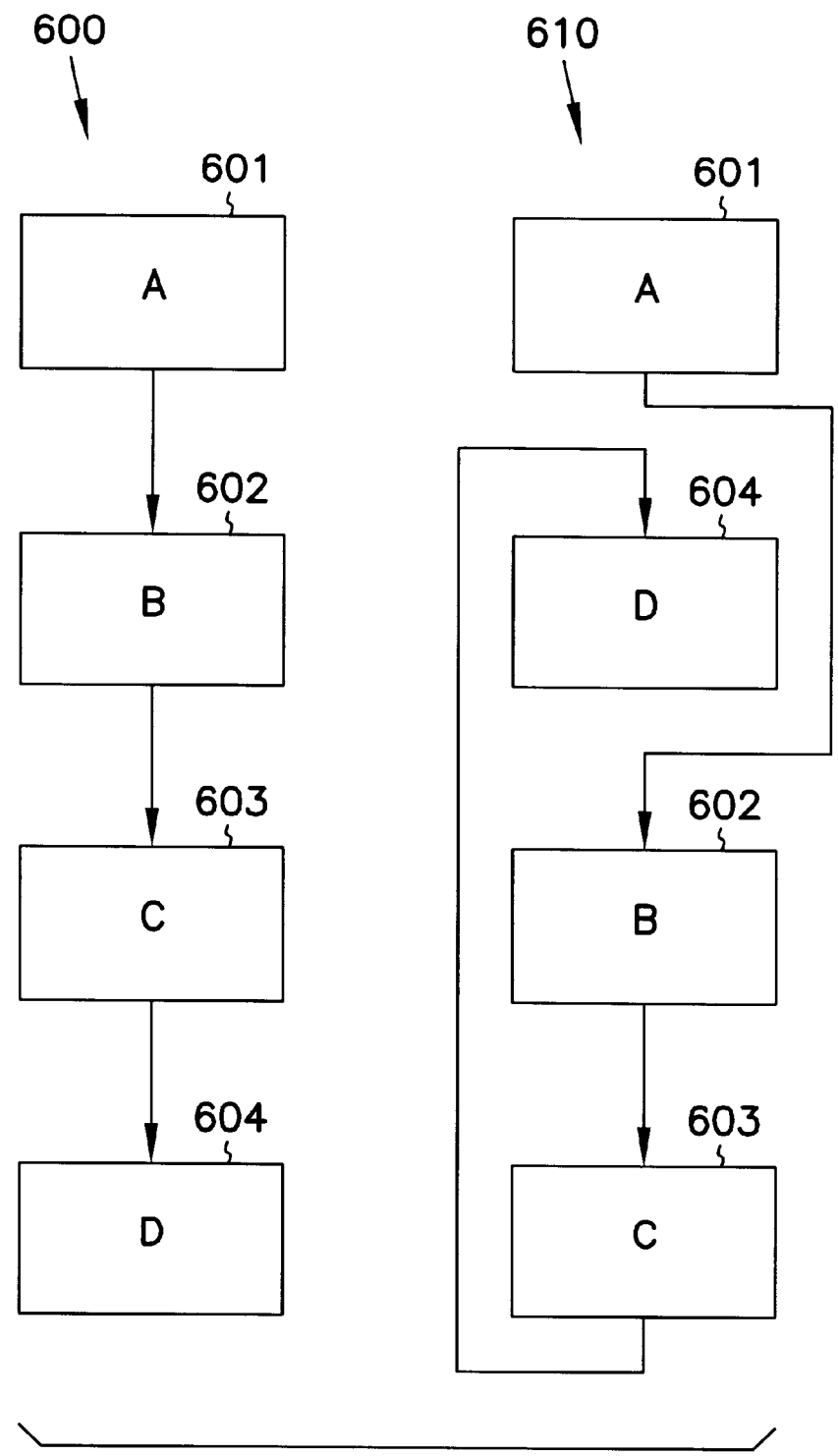
FIGS. 6A and 6B are diagrams control flow changes created by the output translator method of FIG. 4A.

The linker/writer method 400 next performs a consistency check on the code blocks in the IR to preserve the semantics of the original control flow among the code blocks (block 403). Referring to an example provided by FIG. 6A, blocks A 601, B 602, C 603, and D 604 were originally arranged as shown at 600 with the control flowing from A 601 to B 602 to C 603 to D 604. In the IR 610, the block order is A 601, D 604, B 602 and C 603. Therefore, logical linkages are created at block 403 to maintain the original control flow through blocks as shown. Certain optimizations also can be performed at block 403, such as eliminating the jump between blocks B 602 and C 603 in the IR 610.

Figure 6B:
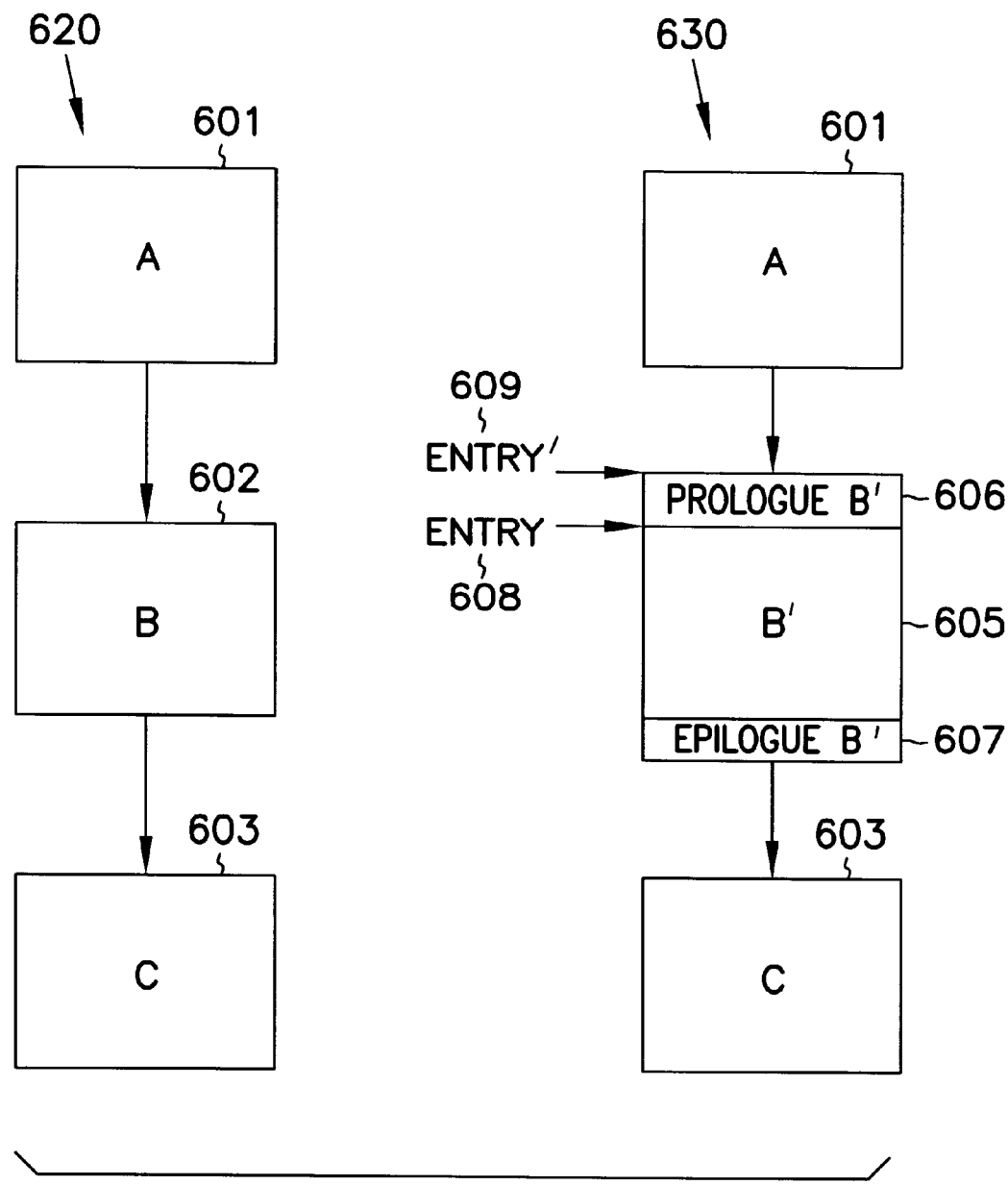

The linker/writer method 400 also determines if two contiguous code blocks in the component are to be emitted for different platforms and creates the prologue and epilogue glue code necessary to transition from one instruction set to another as illustrated in FIG. 6B. In the original component 620, blocks A 601, B 602, and C 603 were all written for the same architecture. However, during the transformation process 230, the user marked code block B 602 to be translated into a different instruction set to produce code block B' 605 in the output binary. The linker/writer method 400 inserts the IR instructions for prologue B' 606 and epilogue B' 607 before and after the IR instructions for block B' 605. Assume, for illustration purposes, that the original component was written in the Intel x86 instruction set but that the user determined that block B 602 would be more optimally written as byte codes for a virtual machine (VM). The IR block hierarchical element is changed to reflect the new architecture. As it walks through the blocks of the component, the linker/writer method 400 keeps track of whether a block is to be emitted for a different platform than that for which it was originally written. The amount of work needed for such a transition is directly proportional to how different the two architectures are. In the present example, IR instructions representing a call to the interpreter for byte codes is added as the prologue B' 606, and this becomes a new entry point (entry') 609 for the block. The call to the interpreter allows the interpreter to get the starting address of the byte codes relative to the beginning of the component 630. Calls from other x86 code blocks to the block B' 605 can skip the call to the interpreter in the prologue B' 606 and jump directly into the byte codes at entry point 608 (native entry point).

The prologue B' 606 and epilogue B' 607 perform the necessary register mapping between the two architecture and adjust the shared stack upon entry and exit from the block B' 605 when the output binary is executed.

The linker/writer method 400 also preserves the semantics of the code flow in architectures in which some instructions, such as a loop instruction, have only a short form and thus cannot reference addresses past a certain relative distance. If in the process of doing a transformation on the IR, additional code was inserted in between blocks in the IR so that a loop instruction can no longer operate properly, block 402 of the linker/writer method 400 inserts indirection code to allow the short form to finction while maintaining the block structure that was introduced by the transformation. In one embodiment, the indirection code comprises a block within the short form addressing range that contains a long form jump instruction to the loop instruction's original target. The loop instruction addresses the jump instruction, and the jump instruction jumps to the target block.

Now that all the blocks have been properly linked and any necessary glue code added, the linker/writer method 400 assigns absolute addresses in an address space for the modified executable EXE' 203 (FIG. 2A) to the blocks in the IR and resolves the logical connections to the appropriate absolute addresses (block 403). In the exemplary embodiment, the processing at block 403 begins by initially assigning an optimal fixed size to each code block whose size could fluctuate (due to certain instruction long and short formats). The size for a data block is fixed and will never change. The optimal fixed size for a code block is computed based on the average number of instructions per block multiplied by the average instruction size. In one embodiment, the average number of instructions per block is 3.2 and the average instruction size is 2.5 bytes, giving an optimal fixed size of 8 bytes. This initial size assignment allows the linker/writer method 400 to perform forward referencing on blocks that have not yet been assigned working or absolute addresses as described next.

The absolute address assignment is performed through two major processing loops. The first or "priming" loop is illustrated in FIG. 4B. The priming loop assigns working addresses to the blocks that represent a displacement relative to the start of the component to initially approximate the block address. For those instructions that have both a long form and a short form ("relative instructions"), the priming loop assigns the short size. After the priming loop has assigned working addresses to each of the blocks, the second or "verification" loop illustrated in FIG. 4C, reevaluates the size of the relative instructions and creates the absolute addresses. Some relative instructions that were originally assumed to be short form may need to change to long form because their target reference is now further away than originally calculated using the initial average sizes for the blocks. Once the priming loop has assigned fairly accurate sizes to the blocks, those relative instructions that are likely to require the long form can be determined by the verification loop with little or no error.

Turning now to FIG. 4C, the priming loop begins by setting a "currentaddress" variable to the starting address of the component (block 410). Each block in the component is examined (block 411) and assigned a starting address equal to the current value in the currentaddress variable (block 412). If the block is a data block (block 413), the currentaddress variable is recalculated to be at the end of the data block using the pre-determined size for a data block (block 414).

If the block is a code block (block 413), each instruction in the code block is examined (block 416) to determine if it is a relative or regular instruction (block 417). A relative instruction is assigned the short form size (block 418). The size of a regular instruction is calculated (block 419). The size of each instruction is stored in the IR element that represents the instruction. In the exemplary embodiment, the short form size is two bytes and the calculation of a regular instruction is performed by calling the appropriate assembler to emit the instruction so the actual size of the instruction can be determined. The appropriate assembler is specified in the IR block element; the calling of the assembler is described further below. The currentaddress variable is recalculated to take into account the instruction's size (block 420).

When all instructions (block 421) in all blocks (block 415) in the component have been examined, every instruction and block has been assigned a working size, and every block has been assigned a relative working starting address.

In an alternate embodiment in which the binary is divided into sections and each section must be assigned on a particular byte boundary, the priming loop is performed on a section by section basis throughout the entire IR, readjusting the starting address of the first block in each section to lie on the correct boundary.

The verification loop illustrated in FIG. 4C checks for the correctness of the size of all relative instructions within the component. If no size adjustments are required, the working addresses are the correct addresses and no address recalculation needs to be done. Therefore, the verification loop uses a "stop" flag to determine that no change is required. If the value of the stop flag is true when the verification loop has reexamined each instruction in the component, no recalculation is necessary.

The verification loop examines each block in the component (block 433). If it is a code block (block 434), each instruction in the code block is examined to determine if it is a relative instruction (block 436). A new size for each relative instruction is calculated using the working block sizes assigned by the priming loop (block 437). If the new size is different than that stored in the corresponding IR instruction element, i.e., long rather than short, (block 438), the new size is stored (block 439) and the stop flag is set to false to indicate that the block sizes and addresses must be recomputed.

Once all instructions (block 441) in all code blocks (block 442) have been reexamined, the currentaddress variable is set to the starting address of the component (block 443) and the stop flag is tested (block 444). If the stop flag is true (block 444 and 431), the working addresses assigned by the priming loop are correct and become the absolute addresses for the component.

If the stop flag is false (block 444), at least one relative instruction has changed in size from short to long, so its block has changed size and the addresses of all blocks within the component must be recalculated. Each block in the component is once again examined (block 445) and its address recomputed based on the new sizes for the instructions (block 446). The stop flag is set to true (448) when addresses have been recomputed for all the blocks (block 447) to end the verification loop. At this point the IR is complete with absolute addresses. If a relative instruction changes from the long form to the short form, the linker/writer method 400 does not revert back to the short form because this would introduce an infinite loop in the process. By prohibiting an instruction from shrinking back, the assign addresses loop illustrated in FIG. 4B is guaranteed to converge and terminate within a "reasonable" time period.

Figure 7:
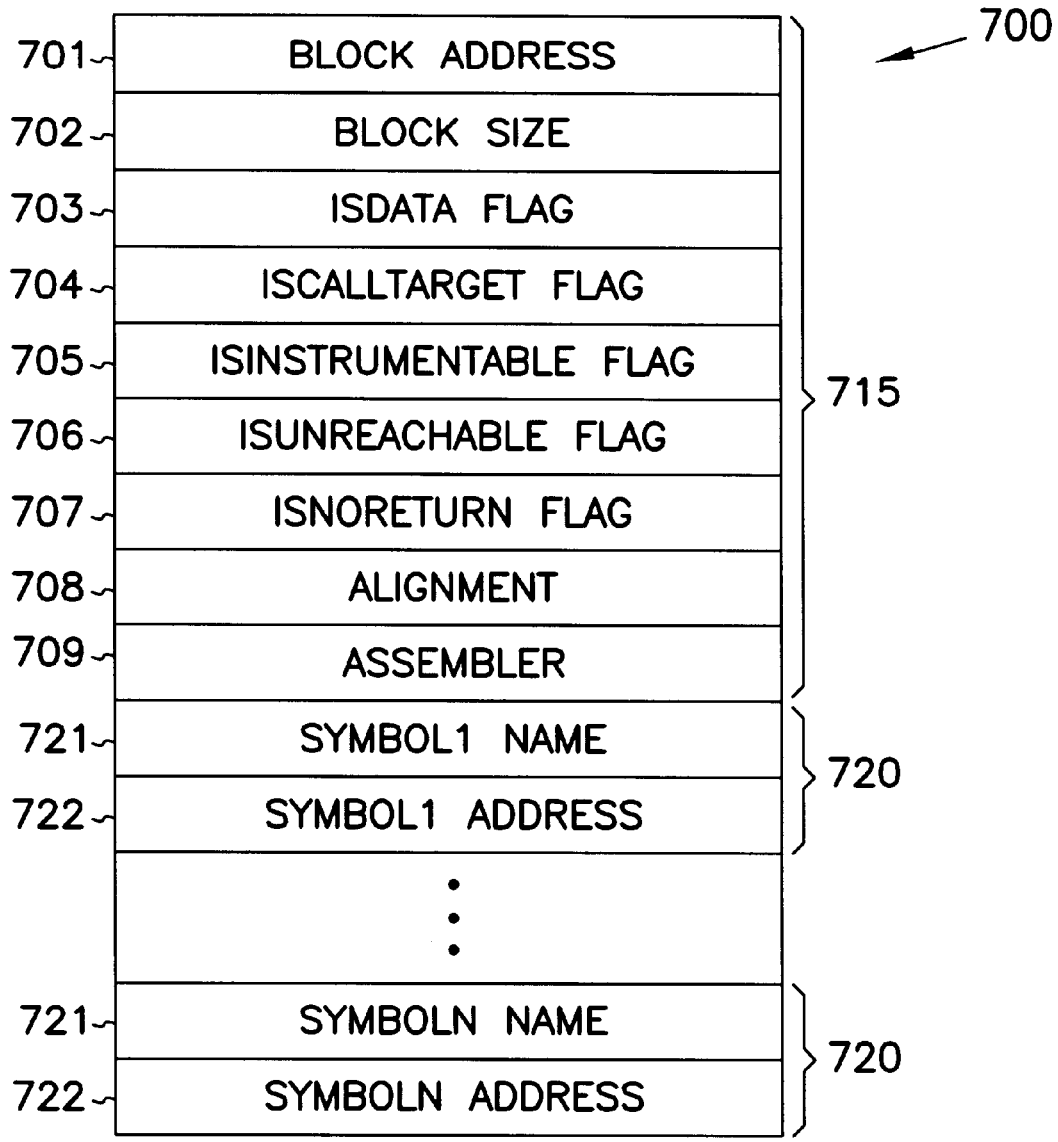
FIG. 7 is a diagram of an emitted block data structure created by the output translator method of FIG. 4A.

Returning now to FIG. 4A, the linker/writer method 400 creates, or updates, the emitted block information data structure (204 or 205 in FIG. 2A) for each block (block 404). One exemplary embodiment of the emitted block information is shown in FIG. 7 as having a block header 715 and a set of symbol table entries 720. The block header 715 contains a block address field 701, a block size field 702, an alignment field 703, and a set of flags 704–710. The block address field 701 is the absolute address for the block within the component assigned by the verification loop in FIG. 4C. The block size field 702 contains the size of the block computed by the verification loop. Table 1 defines the flags 703–709 for the present exemplary embodiment of the header.

TABLE 1

| Flag | Block Type | Description |
| --- | --- | --- |
| IsData | Code or Data | defines block as code or data |
| IsCallTarget | Code | whether block contains an entry point for a procedure |
| IsInstrumentable | Code | whether block can have instrumentation added by user |
| IsUnreachable | Code or Data | whether block can be reached from another block in the binary |
| IsNoReturn | Code | whether block transfers control and does not return to calling block |
| Alignment | Code or Data | boundary on which to align the block, if any |
| Assembler | Code | code architecture |

The linker/writer method 400 creates a large buffer into which the platform-specified code will be emitted (block 405). The method walks through the IR block by block, calling the appropriate assembler to emit the code as defined within the IR block element. For IR instructions that fit a basic format, such as "load," "store," or "add," the linker/writer method 400 submits the appropriate parameters to the assembler and the assembler passes back the corresponding platform-specific instruction, which is placed within the buffer at the address for the instruction. For IR instructions that do not fit the basic format, referred to as extended version or mode IR instructions, the IR instruction element is marked the signature flag of the original architecture. The linker/writer method 400 first determines if the instruction is to be emitted for its original platform. If so, the appropriate parameters from the IR instruction element are passed to the assembler just as with the basic format IR instruction. If the architecture is changing, the linker/writer method 400 uses an translation data structure, such as a hash table, to determine a set of basic format IR instructions that perform the function of the extended mode IR instruction. Each of those IR instructions is passed into the assembler to be emitted as the corresponding platform-specific instruction. There is a translation data structure for each architecture supported by the system and each translation data structure contains entries for only those platform-specific instructions that cannot be represented by the basic IR instruction form. The translation data structures are created outside the system and the information contained therein will be readily apparent to one skilled in the art. An exemplary embodiment of the IR instruction elements in both the basic form and extended version is described in detail in the related "Translation and Transformation" patent application.

After the buffer has been fully populated with instructions for the binary, at block 405 the linker/writer method 400 also updates the source and target addresses that are stored within a symbol table or a program database (PDB file 205 in FIG. 2A) that contain entry points, export entry tables, jump tables, and symbol tables. In one embodiment the information for a source or target address is a displacement into a block instead of being the first address within the block.

The linker/writer method 400 concludes by writing out the buffer to an output file specified by the user to serve as the binary for the component (block 406). The emitted block data structures 700 are written to the output file for the binary (as illustrated by emitted data block information 204 in FIG. 2A) or to the PDB file 205. Additional internal use information is also written to the output file at this time. In one embodiment in which the emitted block information is stored in the output file, the internal use information specifies the offset within the output file at which the emitted block information begins. The internal use information can also contains data such as extended debugging information. In another embodiment in which the emitted block information is written to a separate file, such as the PDB file 205, the internal use information is written to the same file. In yet another alternate embodiment, the internal use information is written to a completely separate file that is associated with the emitted block information file.

The particular methods performed by computer in executing an exemplary embodiment of the output translator 240 have been described with reference to flowcharts including all the acts from 401 until 406, 410 until 421, and 430 until 448. In addition, an exemplary embodiment of an emitted block information data structure created by the output translator 240 has been illustrated.

Conclusion

An output translator has been described that provides for cross module representations of components within a heterogeneous program. The heterogeneous program is translated into an intermediate representation that is a hierarchy of platform-neutral elements that correspond to instructions, code blocks, procedures and components within the program. Blocks of instructions that were originally written for one architecture can be translated from the intermediate representation into platform-specific instructions for a different architecture. The output translator provides any necessary prologue and/or epilogue code to interface contiguous code blocks that are emitted in different instruction sets. Furthermore, for an architecture that has both short and long forms for instructions, the output translator initially assumes the emitted instruction will be in its short form and only substitutes the long form when required, the output code can be more compact than using the long form as the default output format. The choice of the short form for the default also introduces efficiencies into the output translator process because working relative addresses assigned by the priming loop are highly likely to be the absolute address within the output binary, reducing the number of iterations that must be performed to emit the code. Finally, because the code blocks within the components can be translated into different architectures than they were originally written enables faster execution of the program.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that the division of the output translator into a linker and a writer module, and the methods that each perform, can be allocated differently without changing the functions performed by the output translator. Furthermore, those of ordinary skill within the art will appreciate that the translation from the IR instructions into the platform-specific instructions can be accomplished through the use of look-up tables, hashing function, or database records.

The terminology used in this application with respect to is meant to include all of these architectural environments. Therefore, it is manifestly intended that this invention be limited only by the following claims and equivalents thereof.

We claim:

1. A computerized method for translating a heterogeneous program into different architectures comprising:

reading a heterogeneous program having a plurality of executable components in different forms;

obtaining a platform-neutral intermediate representation of a component in the heterogeneous program;

creating logical linkages among a plurality of code blocks in the intermediate representation of the component to establish a control flow through the component;

assigning an absolute address within an address space for the component to each of the plurality of code blocks;

resolving the logical linkages to the absolute addresses for the corresponding code blocks;

emitting a platform-specific executable instruction for each instruction represented in the intermediate representation of the component into a buffer; and writing the buffer to an output file to create a new version of the component.

2. The computerized method of claim 1, further comprising:

inserting interface code between contiguous code blocks having instructions emitted for different architectures.

3. The computerized method of claim 1, further comprising:

replacing an entry point to a first code block with an point to a second code block introduced by a user to substitute for the first code block.

4. The computerized method of claim 1, further comprising:

generating information defining an emitted block; and associating the emitted block information with the new version of the component.

5. The computerized method of claim 1, wherein assigning an absolute address comprises:

assigning a working address and working size to each block in the intermediate representation of the component;

assigning the working address as the absolute address if the working size of each code block is accurate for a corresponding emitted code block; and calculating the absolute address if the working size of each code block is not accurate for the corresponding emitted code block.

6. The computerized method of claim 5, wherein assigning the working address and working size comprises:

determining an emitted size for each instruction in each code block that is a regular instruction; and assigning a fixed size for a short form of each instruction in each code block that is a relative instruction.

7. The computerized method of claim 6, wherein the working size of each code block is accurate for the corresponding emitted code block if the short form is valid for each relative instruction within the code block.

8. The computerized method of claim 1, wherein emitting a platform-specific instruction comprises:

inputting parameters defining the intermediate representation of the instruction to an assembler; and storing the corresponding platform-specific instruction generated by the assembler into the buffer.

9. The computerized method of claim 8, further comprising:

obtaining the parameters from a translation data structure.

10. The computerized method of claim 1 wherein obtaining comprises:

parsing an executable component in the heterogeneous program into basic code blocks; and creating an intermediate representation of the basic code blocks, the intermediate representation comprising a hierarchy of instructions.

11. The computerized method of claim 10 wherein the step of creating an intermediate representation comprises:

annotating the intermediate representation with user names.

12. A computer-readable medium having computer-executable instructions to cause a computer to perform an output translation method on an intermediate representation for a component comprising:

resolving logical references within the intermediate representation to absolute addresses in an address space for the component;

emitting instructions for the component in a plurality of platform-specific instruction sets defined by the intermediate representation; and inserting interface instructions in the intermediate representation between code blocks marked to be emitted in different platform-specific instruction sets, the interface instructions enabling a transition from one platform-specific instruction set to a different platform-specific instruction set.

13. The computer-readable medium of claim 12, wherein resolving logical references comprises:

creating working addresses for a plurality of code blocks in the intermediate representation;

assigning absolute addresses for the plurality of code blocks based on the working addresses; and resolving each logical reference to one of the plurality of code blocks to the absolute address for the one of the plurality of code blocks.

14. A computer-readable medium having stored thereon an emitted block information data structure for describing a code block emitted by a cross-module representation system, the data structure comprising:

an address field containing data representing a starting address for the emitted block;

a size field containing data representing a size of the block starting at the address in the address field;

a flag field containing data representing a set of information flags for the block starting at the address in the address field; and a symbol entry containing data representing a symbol name and a symbol address for a symbol appearing in the block starting at the address in the address field, wherein the emitted block and the data structure are accessible by the cross-module representation system to facilitate optimization of the emitted block.

15. The computer-readable medium of claim 14, further comprising:

an alignment field containing data representing an alignment boundary for the address in the address field.

16. The computer-readable medium of claim 14, wherein the information flags are selected from the group consisting of:

a call target flag;

a begin procedure flag;

a no split flag;

an instrumentable flag;

an unreachable flag;

a data flag; and a no return flag.

17. A computerized system comprising:

a processing unit;

a system memory coupled to the processing unit through a system bus;

a computer-readable medium coupled to the processing unit through a system bus;

a reader module reading a heterogeneous program comprising a plurality of executable components written for two or more computer architectures;

a platform-neutral intermediate representation of the heterogeneous program in the system memory; and an output translator module executed from the computer-readable medium by the processing unit, wherein the output translator module causes the processing unit to translate the intermediate representation into a set of platform-specific instructions that accomplish the function of the heterogeneous program.

18. The computerized system of claim 17, wherein the set of platform-specific instructions includes subsets of platform-specific instructions with the subsets being for different platforms.

19. The computerized system of claim 18, wherein the output translator module further causes the processing unit to insert at least one platform-neutral instruction in the intermediate representation to provide an interface between the subsets of platform-specific instructions.

20. The computerized system of claim 17, wherein the output translator module further causes the processing unit to translate at least one instruction in the intermediate representation into a platform-specific instruction different than a corresponding platform-specific instruction in the heterogeneous program.

21. The computerized system of claim 17, wherein the output translator module further causes the processing unit to activate a platform-specific assembler to generate the set of platform-specific instructions.

22. A computer-readable medium having computer-executable instructions stored thereon for performing a method comprising:

reading a heterogeneous program comprising a plurality of executable components written in two or more instruction sets;

translating an intermediate representation of the heterogeneous program into a set of platform-specific instructions; and writing the platform-specific instructions onto a computer-readable medium to create a new version of the heterogeneous program.

23. The computer-readable medium of claim 22, wherein translating the intermediate representation comprises:

emitting an instruction in the intermediate representation into a platform-specific instruction different than a corresponding platform-specific instruction in the heterogeneous program.

24. The computer-readable medium of claim 23, further comprising:

inserting interface instructions in the intermediate representation between contiguous instructions emitted for different platforms.

* * * * *